(12) United States Patent
Tholar et al.

(10) Patent No.: US 12,626,151 B2
(45) Date of Patent: May 12, 2026

(54) METHOD AND SYSTEM FOR TESTING A CLASSIFICATION MACHINE LEARNING (ML) MODEL OF A TENANT OF A SERVICE PROVIDER, IN A CLOUD-BASED ENVIRONMENT

(71) Applicant: Actimize LTD., Ra'anana (IL)

(72) Inventors: Sunny Tholar, Pune (IN); Ori Snir, Hoboken, NJ (US); Amir Shachar, Haifa (IL)

(73) Assignee: ACTIMIZE LTD., Ra'anana (IL)

( * ) Notice: Subject to any disclaimer, the term of this patent is extended or adjusted under 35 U.S.C. 154(b) by 639 days.

(21) Appl. No.: 18/112,520

(22) Filed: Feb. 22, 2023

(65) Prior Publication Data
US 2024/0281672 A1     Aug. 22, 2024

(51) Int. Cl.
| | |
|---|---|
| *G06F 7/00* | (2006.01) |
| *G06N 5/022* | (2023.01) |
| *G06Q 20/40* | (2012.01) |

(52) U.S. Cl.
CPC ......... *G06N 5/022* (2013.01); *G06Q 20/4016* (2013.01)

(58) Field of Classification Search
CPC ........................... G06N 5/022; G06Q 20/4016

USPC .................................... 707/600–899; 706/12
See application file for complete search history.

(56) References Cited

U.S. PATENT DOCUMENTS 11,838,365 B1 * 12/2023 Jain ........................ G16H 20/10

\* cited by examiner

*Primary Examiner* — Isaac M Woo
(74) *Attorney, Agent, or Firm* — SOROKER AGMON NORDMAN RIBA; Liat Lin

(57) ABSTRACT

A computerized-method for testing a classification ML model of a tenant of a service provider, in a cloud-based environment. The computerized-method includes: (i) receiving an object of a classification ML model for testing from the tenant; (ii) executing an API with the received object of the classification ML model; (iii) identifying one or more tenants of the service provider based on an activity type and preconfigured characteristics by the executed API; (iv) performing an evaluation of the object of the classification ML model by operating the API on each retrieved dataset of the one or more tenants of the service provider to evaluate the object of the classification ML model and store score-results; and (v) calculating an average of the stored score-results to yield a performance-score of the classification ML model. When the performance-score is above a predefined performance-score deploying the classification ML model in a system of the tenant.

12 Claims, 14 Drawing Sheets

200

210 receiving an object of a classification ML model for testing, from the tenant;

220 executing an Application Programming Interface (API) with the received object of the classification ML model;

230 identifying one or more tenants of the service provider based on an activity type and preconfigured characteristics by the executed API;

240 performing an evaluation of the object of the classification ML model by operating the API on each retrieved dataset of the one or more tenants of the service provider to evaluate the object of the classification ML model and store score-results, each dataset is having similar attributes as the received object of classification ML model;

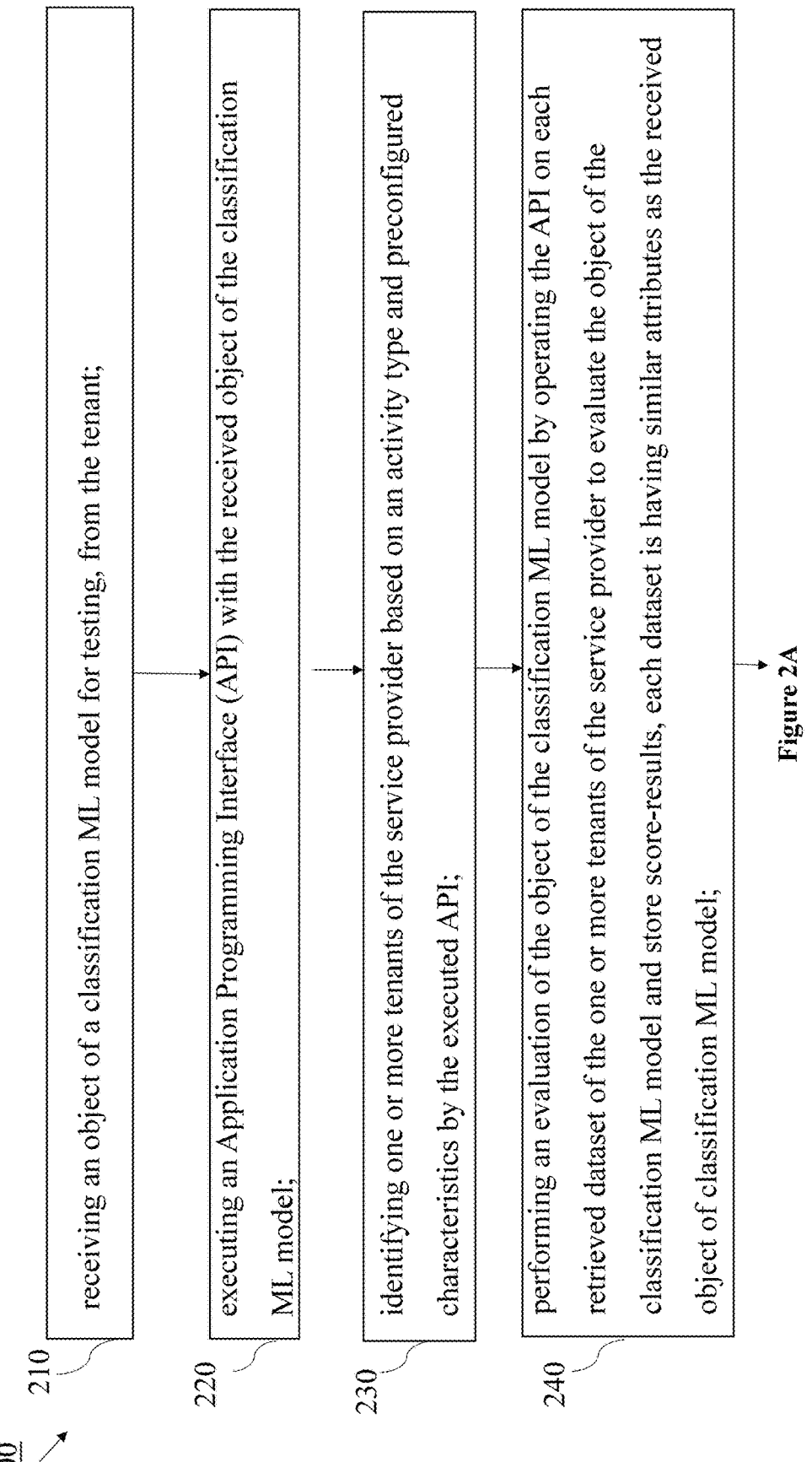

200

210 receiving an object of a classification ML model for testing, from the tenant;

220 executing an Application Programming Interface (API) with the received object of the classification ML model;

230 identifying one or more tenants of the service provider based on an activity type and preconfigured characteristics by the executed API;

240 performing an evaluation of the object of the classification ML model by operating the API on each retrieved dataset of the one or more tenants of the service provider to evaluate the object of the classification ML model and store score-results, each dataset is having similar attributes as the received object of classification ML model;

250 calculating an average of the stored score-results to yield a performance-score of the classification ML model, when the performance-score is above a predefined performance-score deploying the classification ML model in a system of the tenant of the service provider.

Figure 2B

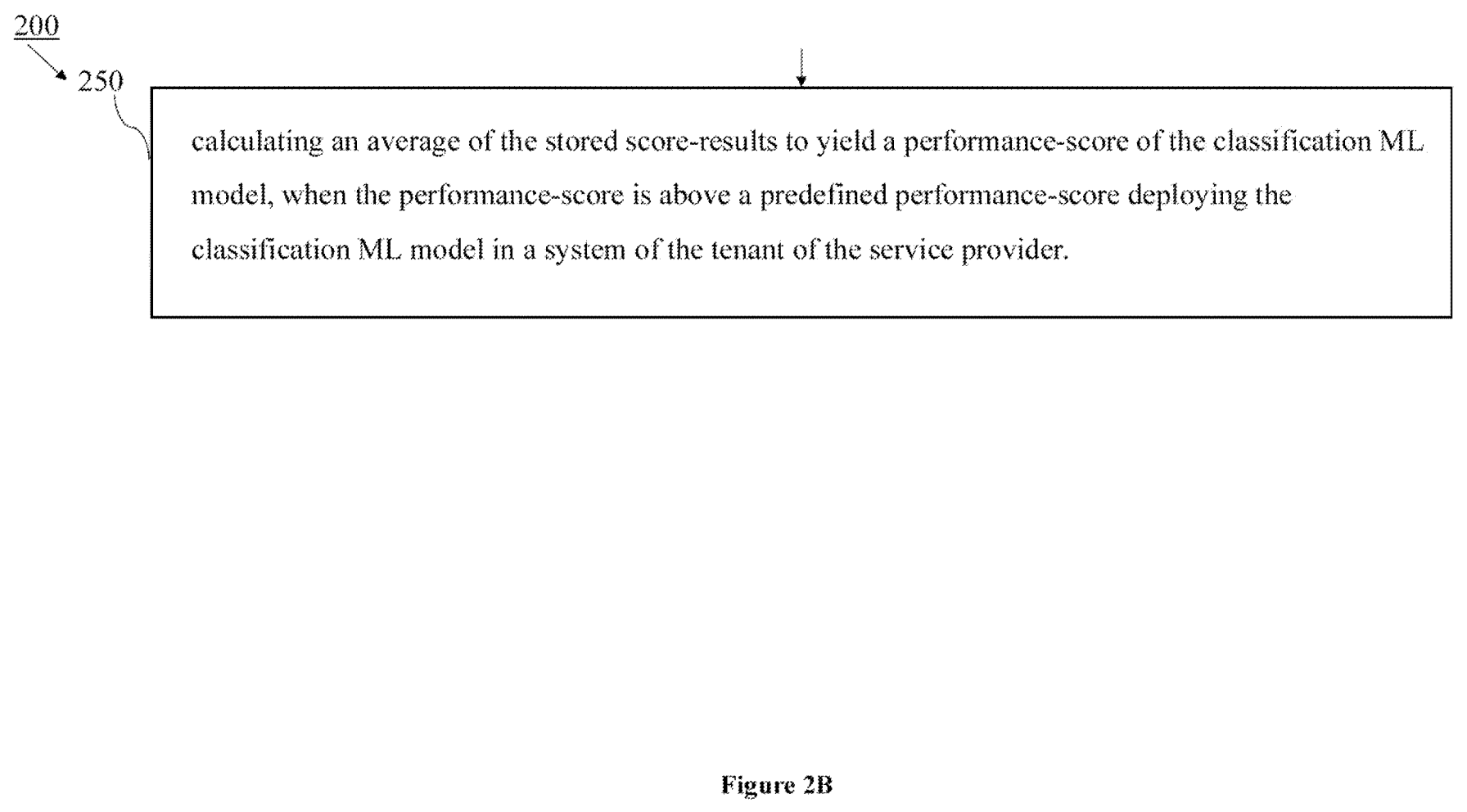

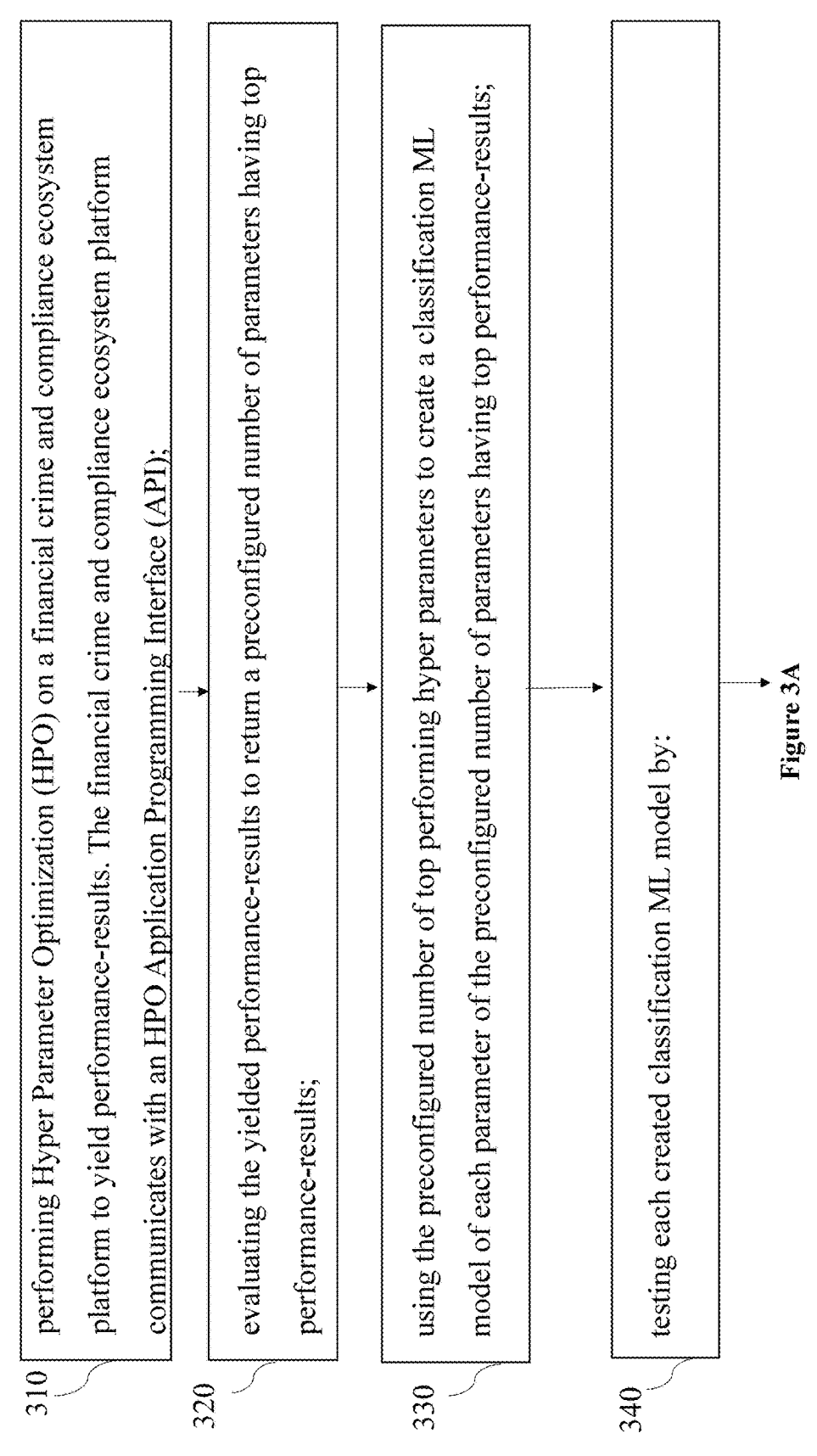

310 — performing Hyper Parameter Optimization (HPO) on a financial crime and compliance ecosystem platform to yield performance-results. The financial crime and compliance ecosystem platform communicates with an HPO Application Programming Interface (API);

320 — evaluating the yielded performance-results to return a preconfigured number of parameters having top performance-results;

330 — using the preconfigured number of top performing hyper parameters to create a classification ML model of each parameter of the preconfigured number of parameters having top performance-results;

340 — testing each created classification ML model by:

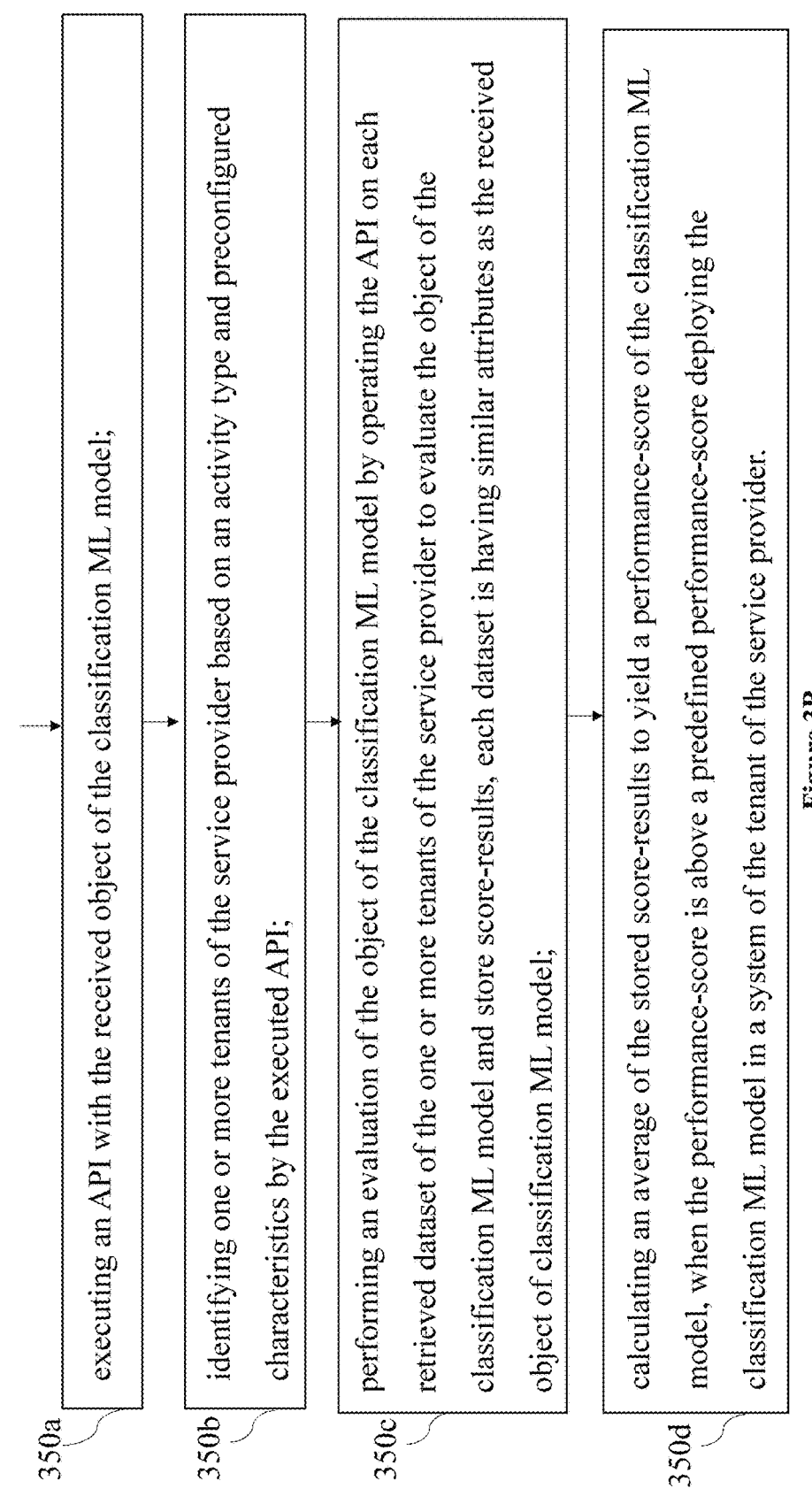

300

350a executing an API with the received object of the classification ML model;

350b identifying one or more tenants of the service provider based on an activity type and preconfigured characteristics by the executed API;

350c performing an evaluation of the object of the classification ML model by operating the API on each retrieved dataset of the one or more tenants of the service provider to evaluate the object of the classification ML model and store score-results, each dataset is having similar attributes as the received object of classification ML model;

350d calculating an average of the stored score-results to yield a performance-score of the classification ML model, when the performance-score is above a predefined performance-score deploying the classification ML model in a system of the tenant of the service provider.

Figure 3B

Average Performance across consortium tenants:

800A

API - 1

| DR - AR1% | DR - AR2% | VDR - AR1% | VDR - AR2% |
|---|---|---|---|
| 68 | 72 | 83 | 88 |

API - 2

| min child weight | eta | max depth | gamma | rounds | subsample | scale pos weight | colsample bytree | reg alpha | Accuracy |
|---|---|---|---|---|---|---|---|---|---|
| 10 | 0.083173841 | 4.5 | 12.27838704 | 71.5 | 0.781858965 | 173 | 0.505591245 | 0.690424148 | 0.6 |

Figure 8A

METHOD AND SYSTEM FOR TESTING A CLASSIFICATION MACHINE LEARNING (ML) MODEL OF A TENANT OF A SERVICE PROVIDER, IN A CLOUD-BASED ENVIRONMENT

TECHNICAL FIELD

The present disclosure relates to the field of Machine Learning (ML) based systems and more specifically to Machine Learning (ML) model training, evaluation and selection in a cloud-based environment.

BACKGROUND

An Artificial Intelligence (AI)-based system is a computer system which is able to perform tasks that ordinarily require human intelligence. Many of these AI-based systems are powered by ML models, some of them are powered by deep learning models and some of them are powered by rules-based ML models.

Financial institutions often lack high-quality fraud data to test these ML models with. For example, low fraud counts, as compared to legit data, may challenge the creation and the testing of a robust ML model. Due to the low fraud counts financial, financial institutions may use most of the fraud transaction for training and as a result very few numbers of frauds are left for the testing stage of the ML model that has been created.

Furthermore, there are situations where the financial institutions may have sufficient data to train the ML model but no data to perform Hyper Parameter Optimization (HPO) as part of the training phase and consequently the client trains the ML model with a default set of parameters instead of optimized hyper parameters which results in a less robust ML model.

As a result of the described lacuna, financial institutions are hesitant to deploy these ML models into production as they are concerned with unpredicted data patterns which may be overlooked by the ML model and as a result expose the financial institutions to increased losses.

Accordingly, there is a need for a technical solution that will provide financial institutions a mechanism that enables testing of the fraud detection ML models on data assets and further provides a good validation of performance of these tested fraud detection models as well as enables HPO as part of the training phase.

There is a need for a system and method for testing a classification Machine Learning (ML) model of a tenant of a service provider, in a cloud-based environment and system and method for training and testing a classification ML model of a tenant of a service provider, in the cloud-based environment.

SUMMARY

There is thus provided, in accordance with some embodiments of the present disclosure, a computerized-method for testing a classification Machine Learning (ML) model of a tenant of a service provider, in a cloud-based environment.

In accordance with some embodiments of the present disclosure, the computerized-method includes: (i) receiving an object of a classification ML model for testing, from the tenant; (ii) executing an Application Programming Interface (API) with the received object of the classification ML model; (iii) identifying one or more tenants of the service provider based on an activity type and preconfigured characteristics by the executed API; (vi) performing an evaluation of the object of the classification ML model by operating the API on each retrieved dataset of the one or more tenants of the service provider to evaluate the object of the classification ML model and store score-results, each dataset is having similar attributes as the received object of classification ML model; and (v) calculating an average of the stored score-results to yield a performance-score of the classification ML model. When the performance-score is above a predefined performance-score deploying the classification ML model in a system of the tenant of the service provider.

Furthermore, in accordance with some embodiments of the present disclosure, the tenants may be Financial Institutions (FI)s.

Furthermore, in accordance with some embodiments of the present disclosure, the preconfigured characteristics may be selected from at least one of: (i) fraud rate; (iii) number of transactions in a preconfigured period; (iii) unique payee; (iv) average daily transaction; (v) average weekly transaction; and (vi) number of clean transaction divided by number of fraud transaction.

Furthermore, in accordance with some embodiments of the present disclosure, the identified one or more tenants may share similar traits to the tenant that is having the classification ML model tested.

Furthermore, in accordance with some embodiments of the present disclosure, the evaluation of the object of the classification ML model may be operated on one or more datasets of tenants of the service provider.

Furthermore, in accordance with some embodiments of the present disclosure, the evaluation of the object of the classification ML model may be by at least one parameters of: (i) feature list; (ii) list of alert rate; and (iii) month.

Furthermore, in accordance with some embodiments of the present disclosure, the evaluation may be performed according to detection rate and value detection rate for a list of alert rates provided by the tenant.

Furthermore, in accordance with some embodiments of the present disclosure, data of each retrieved dataset of the one or more tenants of the service provider may be uploaded to a cloud object storage from one or more databases in each identified tenant system.

Furthermore, in accordance with some embodiments of the present disclosure, the one or more databases may be selected from at least one of: (i) customer database; (ii) recent data database; and (iii) behavioral profiles database.

Furthermore, in accordance with some embodiments of the present disclosure, the system of the tenant of the service provider that the classification ML model is deployed in may be an Integrated Fraud Management (IFM) system for automatically scoring financial transactions by the operation of the deployed classification ML model.

Furthermore, in accordance with some embodiments of the present disclosure, based on a score of a financial transaction the financial transaction may be allowed or declined or delayed until an operator action is taken regarding the transaction.

Furthermore, in accordance with some embodiments of the present disclosure, the activity may be selected from at least one of: (i) Person to Person (P2P) transfer; and (ii) Automated Clearing House (ACH) transfer; (iii) checks deposit; (iv) non wire transfer; and (v) wire transfer.

There is further provided, in accordance with some embodiments of the present invention, a computerized-system for testing a classification Machine Learning (ML) model of a tenant of a service provider, in a cloud-based environment.

Furthermore, in accordance with some embodiments of the present disclosure, the computerized-system includes one or more processors, the one or more processors may be configured to: (i) receive an object of a classification ML model for testing, from the tenant; (ii) execute an Application Programming Interface (API) with the received object of the classification ML model; (iii) identify one or more tenants of the service provider based on an activity type and preconfigured characteristics by the executed API; (iv) perform an evaluation of the object of the classification ML model by operating the API on each retrieved dataset of the one or more tenants of the service provider to evaluate the object of the classification ML model and store score-results, each dataset is having similar attributes as the received object of classification ML model; and (v) calculate an average of the stored score-results to yield a performance-score of the classification ML model. When the performance-score may be above a predefined performance-score deploying the classification ML model in a system of the tenant of the service provider.

There is further provided, in accordance with some embodiments of the present disclosure, a computerized-method for training and testing a classification Machine Learning (ML) model of a tenant of a service provider, in a cloud-based environment. The computerized-method includes: (i) performing Hyper Parameter Optimization (HPO) on a financial crime and compliance ecosystem platform to yield performance-results. The financial crime and compliance ecosystem platform communicates with an HPO Application Programming Interface (API); (ii) evaluating the yielded performance-results to return a preconfigured number of parameters having top performance-results; (iii) using the preconfigured number of top performing hyper parameters to create a classification ML model of each parameter of the preconfigured number of parameters having top performance-results; and (iv) testing each created classification ML model by: a. executing an API with the received object of the classification ML model; b. identifying one or more tenants of the service provider based on an activity type and preconfigured characteristics by the executed API; c. performing an evaluation of the object of the classification ML model by operating the API on each retrieved dataset of the one or more tenants of the service provider to evaluate the object of the classification ML model and store score-results, each dataset is having similar attributes as the received object of classification ML model; and d. calculating an average of the stored score-results to yield a performance-score of the classification ML model, when the performance-score is above a predefined performance-score deploying the classification ML model in a system of the tenant of the service provider.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIGS. 2A-2B are a schematic flowchart a computerized-method for testing a classification Machine Learning (ML) model of a client, in a cloud-based environment, in accordance with some embodiments of the present invention;

FIGS. 3A-3B are a schematic flowchart a computerized-method for training and testing a classification Machine Learning (ML) model of a client, in a cloud-based environment, in accordance with some embodiments of the present invention;

FIGS. 8A-8B are examples of performance results, in accordance with some embodiments of the present invention.

DETAILED DESCRIPTION

Figure 1A:
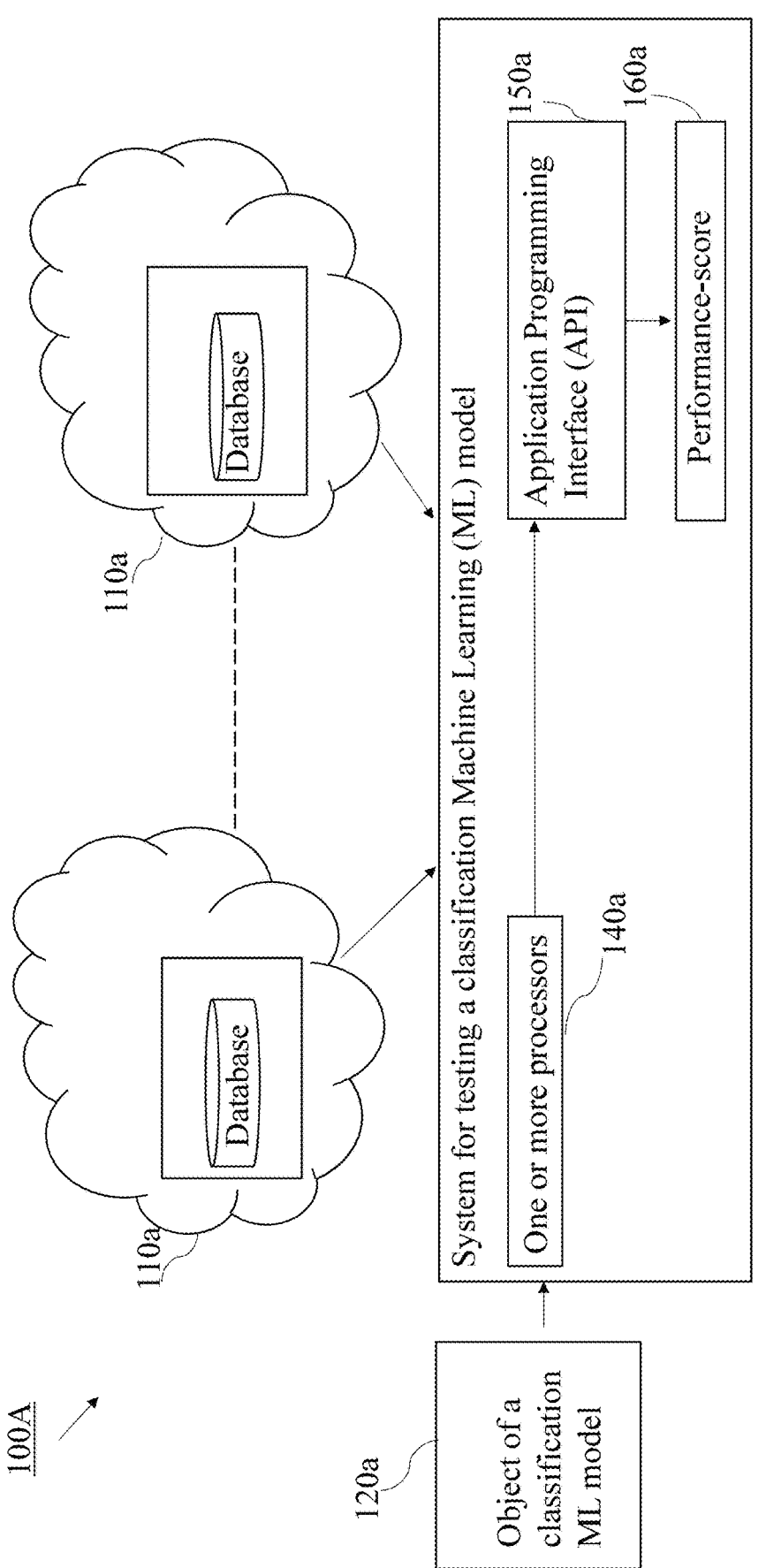
FIG. 1A schematically illustrates a high-level diagram of a computerized-system for testing a classification Machine Learning (ML) model of a client, in a cloud-based environment, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

According to some embodiments of the present disclosure, in AI-based solutions to prevent fraud by incorporating supervised machine learning, labeled data may be received from the client in a tabular data format where each transaction has its label based on previous investigations from the past by the client, e.g., financial institution. A typical transaction includes various attributes that are heterogeneous by its nature: numerical, categorical, ordinal etc. The tabular data format may be for example as shown in the table below.

| Transaction | attribute 1 | attribute 2 | . . . | attribute n | Label |
|---|---|---|---|---|---|
| trx 1 | value | value | | value | legit |
| . . . | . . . | . . . | . . . | . . . | . . . |
| trx N | value | value | | value | fraud |

According to some embodiments of the present disclosure, the attributes may be for example, amount of transferred money, payer name, payor name, payer address, payor address, bank name, device type, geolocation and the like.

According to some embodiments of the present disclosure, a ML model may be trained on both legit and fraud historical data to detect future frauds. However, due to few occurrences of fraud patterns, financial institutions often lack the ability to tune and test their fraud detection machine learning models.

Therefore, there is a need for a technical solution for testing a classification Machine Learning (ML) model or training and testing a classification ML model for a tenant of a service provider, in a cloud-based environment, to overcome data shortages.

FIG. 1A schematically illustrates a high-level diagram of a computerized-system 100A for testing a classification Machine Learning (ML) model of a client, in a cloud-based environment, in accordance with some embodiments of the present invention.

According to some embodiments of the present disclosure, the computerized-system 100A may implement the operations of testing a classification Machine Learning (ML) model of a tenant of a service provider, in a cloud-based environment, such as computerized-method for testing a classification Machine Learning (ML) model of a client, in a cloud-based environment 200 in FIGS. 2A-2B, when a tenant may have sufficient data to perform Hyper Parameter Optimization (HPO) and train a final classification ML model but does not have sufficient data to test this model.

According to some embodiments of the present disclosure, a system, such as computerized-system 100A may provide an Application Programming Interface (API), such as API 150a through which clients may provide their model logic, e.g., object of a classification ML model 120a, as input along with an optional set of hyperparameters that they wish to conduct the tuning. The API 150a may provide a model validation by calculating a performance score 160a to the provided object of the classification ML model 120a.

According to some embodiments of the present disclosure, via access to the API 150a, a tenant may test their model, e.g., object of a classification ML model 120a, across similar datasets of other tenants, e.g., datasets retrieved from database 110a, by taking the provided object of a classification ML model 120a and feature descriptions in the API and evaluating the provided object of a classification ML model 120a on datasets of similar tenants, e.g., FIs. The evaluation may be performed by calculating an average performance of the provided object of a classification ML model and sending it back to the tenant as a response. Thus, by providing the tenant the average performance score of the provided object of a classification ML model, increasing the level of confidence when deploying the object of a classification ML model that is above a preconfigured threshold in a system or in production environment.

According to some embodiments of the present disclosure, the computerized-system 100A for testing a classification ML model of a tenant of a service provider, in a cloud-based environment, may use collective data to test a provided object of a classification ML model 120a.

According to some embodiments of the present disclosure, one or more processors 140a may be configured to receive an object of a classification ML model for testing and execute an API, such as API 150a with the received object of the classification ML model. Then, one or more tenants of the service provider may be identified based on an activity type and preconfigured characteristics by the executed API 150a. The identified one or more tenants may share similar traits to the tenant that is having the classification ML model tested. For example, the activity type may be selected from at least one of: (i) Person to Person (P2P) transfer; and (ii) Automated Clearing House (ACH) transfer; (iii) checks deposit; (iv) non wire transfer; and (v) wire transfer.

According to some embodiments of the present disclosure, the preconfigured characteristics of the one or more tenants may be selected from at least one of: (i) fraud rate; (iii) number of transactions in a preconfigured period; (iii) unique payee; (iv) average daily transaction; (v) average weekly transaction; and (vi) number of clean transaction divided by number of fraud transaction.

According to some embodiments of the present disclosure, an evaluation of the object of the classification ML model 120a may be performed by operating the API 150a on each retrieved dataset of the one or more tenants of the service provider 110a to evaluate the object of the classification ML model and store score-results of each operation on each retrieved dataset. An average of the stored score-results may be calculated to yield a performance-score of the classification ML model 120a.

According to some embodiments of the present disclosure, the evaluation of the object of the classification ML model 120a may be operated on one or more datasets of tenants of the service provider 110a. Moreover, the evaluation of the object of the classification ML model 120a may be operated by at least one parameters of: (i) feature list; (ii) list of alert rate; and (iii) month.

According to some embodiments of the present disclosure, the evaluation may be performed according to a detection rate and a value detection rate for a list of alert rates provided by the tenant.

According to some embodiments of the present disclosure, each dataset may have similar attributes as the received object of classification ML model 120a.

According to some embodiments of the present disclosure, data of each retrieved dataset of the one or more tenants of the service provider may be uploaded to a cloud object storage from one or more databases in each identified tenant system 110. The system of the tenant of the service provider that the classification ML model is deployed in, may be an Integrated Fraud Management (IFM) system for automatically scoring financial transactions by the operation of the deployed classification ML model.

According to some embodiments of the present disclosure, when the performance-score is above a predefined performance-score the tenant that provided the object of the classification ML model 120a may deploy the classification ML model in a system or in production environment.

According to some embodiments of the present disclosure, the tenants may be financial Institutions (FI)s.

According to some embodiments of the present disclosure, the one or more databases may be selected from at least one of: (i) customer database; (ii) recent data database; and (iii) behavioral profiles database.

According to some embodiments of the present disclosure, based on a score of a financial transaction, by the deployed classification ML model, the financial transaction may be allowed or declined or delayed until an operator action is taken regarding the transaction.

Figure 1B:
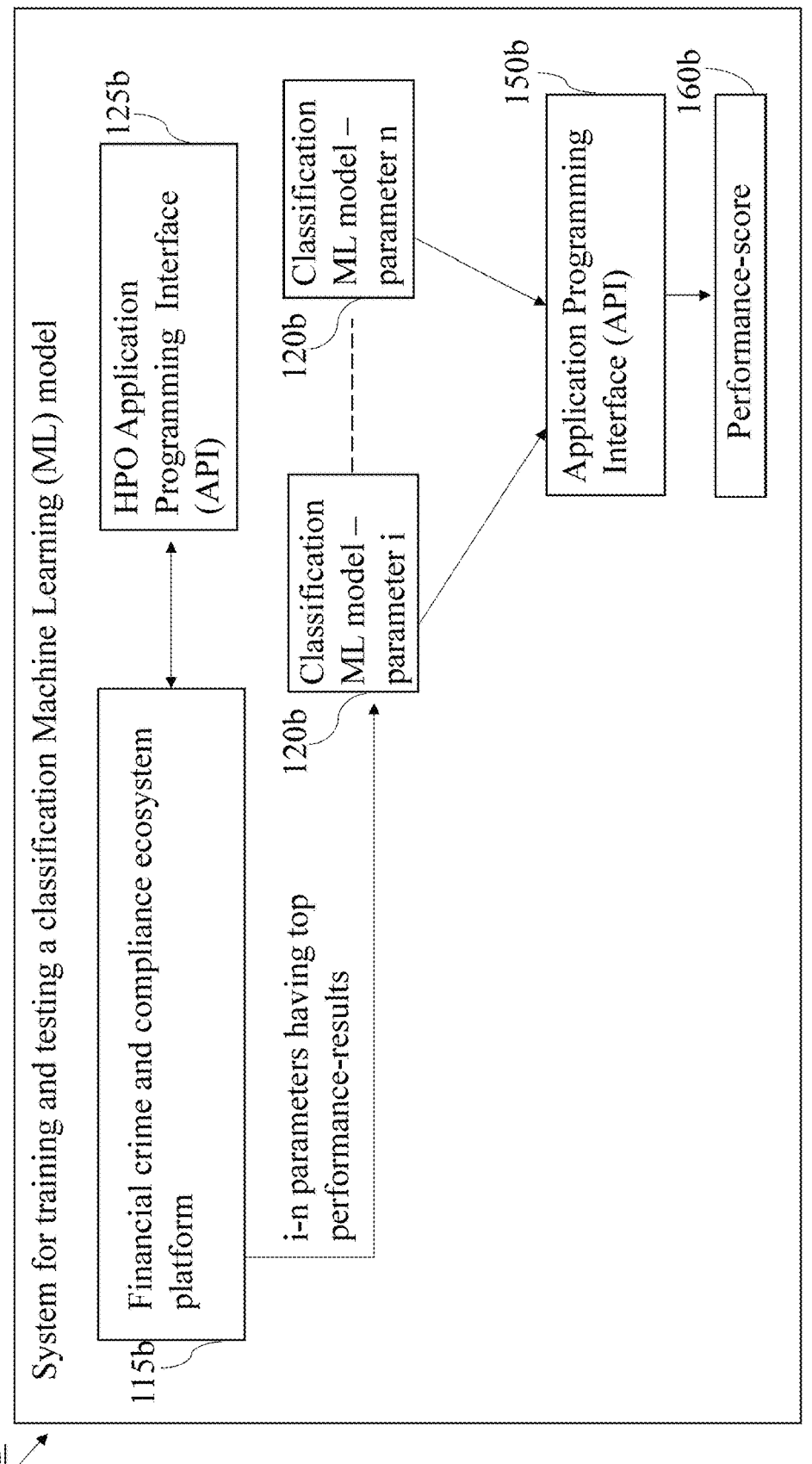
FIG. 1B schematically illustrates a high-level diagram a computerized-system for training and testing a classification Machine Learning (ML) model of a client, in a cloud-based environment, in accordance with some embodiments of the present invention.

FIG. 1B schematically illustrates a high-level work-flow on a computerized-system 100B for training and testing a classification Machine Learning (ML) model of a client, in a cloud-based environment, in accordance with some embodiments of the present invention.

According to some embodiments of the present disclosure, the computerized-system 100B may implement the operations of training and testing a classification Machine Learning (ML) model of a tenant of a service provider, in a cloud-based environment, such as computerized-method for testing a classification Machine Learning (ML) model of a client, in a cloud-based environment 300 in FIGS. 3A-3B, when the tenant has limited data even to perform HPO for training the classification ML model. In such a case, the tenant may initially operate an HPO API such as HPO API 125b to get a best set of parameters, then train the classification ML model on each one of these parameters and then call an API, such as API 150b and API 150a in FIG. 1A to receive a performance-score 160b.

According to some embodiments of the present disclosure, computerized-system 100B may performing Hyper Parameter Optimization (HPO) on a financial crime and compliance ecosystem platform 115b to yield performance-results. The financial crime and compliance ecosystem platform may communicate with an HPO Application Programming Interface (API) 125b for that purpose.

According to some embodiments of the present disclosure, the yielded performance-results may be evaluated to return a preconfigured number of parameters having top performance-results.

According to some embodiments of the present disclosure, the preconfigured number of top performing hyper parameters may be used to create a classification ML model 120b of each parameter of the preconfigured number of parameters having top performance-results. Thus, using collective data of one or more other tenants to create hyperparameters settings.

According to some embodiments of the present disclosure, each created classification model 120b may be tested by: a. executing an API 150b with the received object of the classification ML model 120b. b. identifying one or more tenants of the service provider based on an activity type and preconfigured characteristics by the executed API 150b. c. performing an evaluation of the object of the classification ML model 120b by operating the API 150b on each retrieved dataset of the one or more tenants of the service provider to evaluate the object of the classification ML model 120b and store score-results. Each dataset has similar attributes as the received object of classification ML model. Data of each retrieved dataset of the one or more tenants of the service provider may be uploaded to a cloud object storage from one or more databases in each identified tenant system. The one or more databases may be selected from at least one of: (i) customer database; (ii) recent data database; and (iii) behavioral profiles database.

According to some embodiments of the present disclosure, the evaluation of the object of the classification ML model may be operated on one or more datasets of tenants of the service provider. Moreover, the evaluation of the object of the classification ML model 120b may be by at least one parameters of: (i) feature list; (ii) list of alert rate; and (iii) month and may be performed according to a detection rate and a value detection rate for a list of alert rates provided by the tenant.

According to some embodiments of the present disclosure, d. calculating an average of the stored score-results to yield a performance-score of the classification ML model 160b. The identified one or more tenants may share similar traits to the tenant that is having the one or more classification ML models 120b tested.

According to some embodiments of the present disclosure, when the performance-score is above a predefined performance-score the classification ML model may be deployed in a system of the tenant of the service provider.

According to some embodiments of the present disclosure, the tenants are financial Institutions (FI)s.

According to some embodiments of the present disclosure, the system of the tenant of the service provider that the classification ML model may be deployed in is an Integrated Fraud Management (IFM) system for automatically scoring financial transactions by the operation of the deployed classification ML model. Based on a score of a financial transaction the financial transaction may be allowed or declined or delayed until an operator action is taken regarding the transaction.

According to some embodiments of the present disclosure, the preconfigured characteristics may be selected from at least one of: (i) fraud rate; (iii) number of transactions in a preconfigured period; (iii) unique payee; (iv) average daily transaction; (v) average weekly transaction; and (vi) number of clean transaction divided by number of fraud transaction.

Figure 1C:
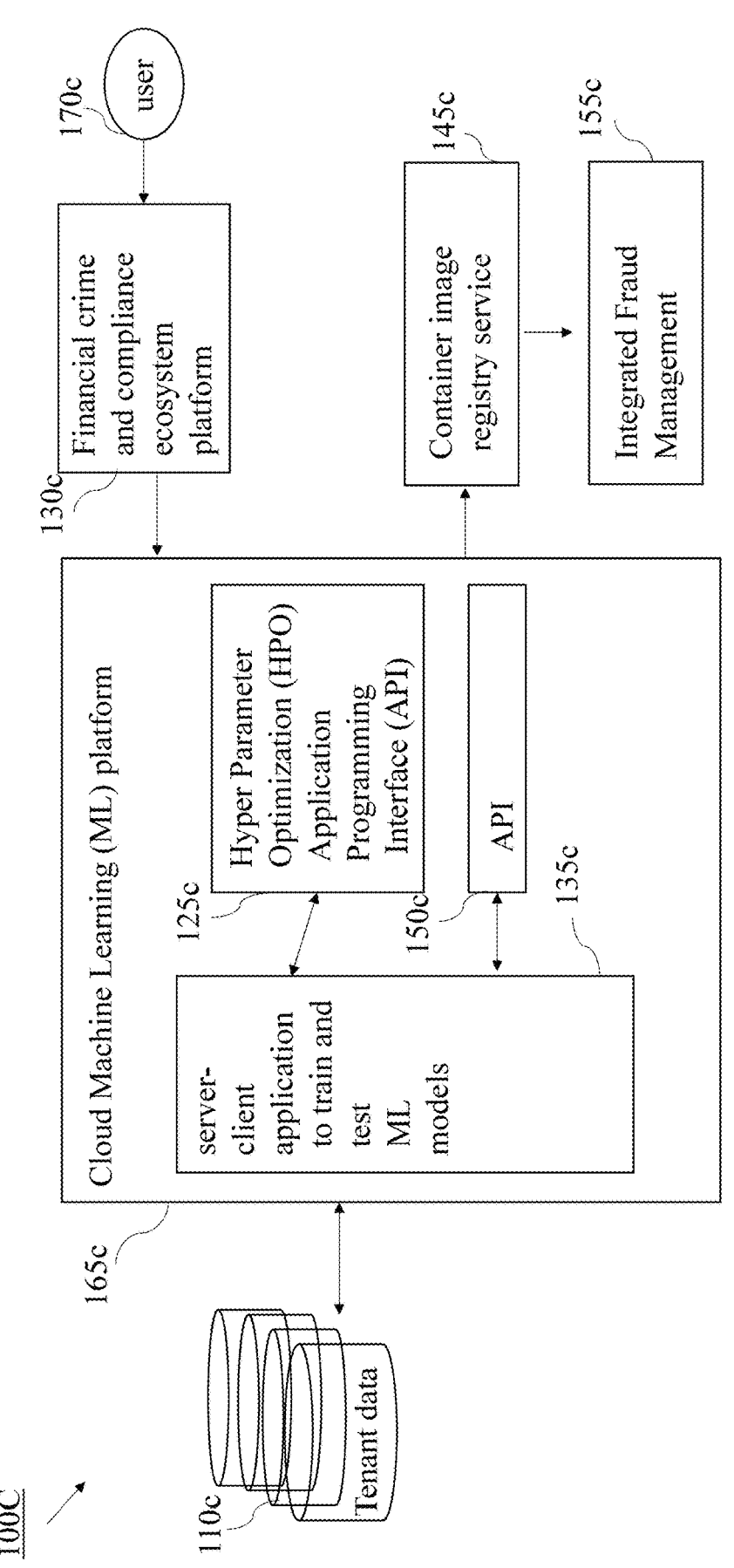
FIG. 1C schematically illustrates a high-level diagram a computerized-system for training and testing a classification Machine Learning (ML) model of a client, in a cloud-based environment, in accordance with some embodiments of the present invention.

FIG. 1C schematically illustrates a high-level diagram a computerized-system 100C for training and testing a classification Machine Learning (ML) model of a client, in a cloud-based environment, in accordance with some embodiments of the present invention.

According to some embodiments of the present disclosure, computerized-system 100B in FIG. 1B for training and testing a classification Machine Learning (ML) model may be implemented in a cloud ML platform 165c, such as AWS Sagemaker of Amazon®. The cloud ML platform 165c, enables developers to create, train, and deploy machine-learning models in the cloud computing environment. It also enables developers to deploy ML models on embedded systems and edge-devices.

According to some embodiments of the present disclosure, the cloud ML platform 165c may include a server-client application to train and test ML models 135c. The server-client application to train and test ML models may be for example, Jupyter® Notebook App, which is a web-based interactive development environment for notebooks, code, and data that enables users to prepare and process data, write code to train models, deploy models to a cloud ML platform 165*c*, such as Amazon® Web Services (AWS) SageMaker hosting, and test or validate ML models.

According to some embodiments of the present disclosure, a user, such as user 170*c* may login to a financial crime and compliance ecosystem platform 130*c*, such as X-sight® Marketplace portal to open a notebook instance, for example, an instance of Jupyter® Notebook App, from where an API, such as API 150*c* and such as 150*a* in FIG. 1A and such as API 150*b* in FIG. 1B or HPO API, such as HPO API 125*c* or HPO API 125*b* in FIG. 1B may be called.

According to some embodiments of the present disclosure, a container image registry service 145*c*, such as Amazon® Elastic Container Registry (ECR), which supports private repositories using AWS Identity and Access Management (IAM) may be used for deploying the model in production.

According to some embodiments of the present disclosure, an evaluation of an object of a classification ML model, such as the object of a classification ML model 120*a* in FIG. 1A, by operating an API, such as API 150*c* on each retrieved dataset from the tenants databases 110*c* may evaluate the object of the classification ML model and store score-results in a data storage.

According to some embodiments of the present disclosure, the system of the tenant of the service provider that the evaluated classification ML model may be deployed in may be an Integrated Fraud Management (IFM) system 155*c* for automatically scoring financial transactions by the operation of the deployed classification ML model. Based on a score of a financial transaction the financial transaction may be allowed or declined or delayed until an operator action is taken regarding the transaction.

FIGS. 2A-2B is a schematic flowchart a computerized-method for testing a classification Machine Learning (ML) model of a client, in a cloud-based environment, in accordance with some embodiments of the present invention.

According to some embodiments of the present disclosure, operation 210 comprising receiving an object of a classification ML model for testing, from the tenant.

According to some embodiments of the present disclosure, operation 220 comprising executing an Application Programming Interface (API) with the received object of the classification ML model.

According to some embodiments of the present disclosure, operation 230 comprising identifying one or more tenants of the service provider based on an activity type and preconfigured characteristics by the executed API. The activity type is selected from at least one of: (i) Person to Person (P2P) transfer; and (ii) Automated Clearing House (ACH) transfer; (iii) checks deposit; (iv) non wire transfer; and (v) wire transfer.

According to some embodiments of the present disclosure, operation 240 comprising performing an evaluation of the object of the classification ML model by operating the API on each retrieved dataset of the one or more tenants of the service provider to evaluate the object of the classification ML model and store score-results, each dataset is having similar attributes as the received object of classification ML model.

According to some embodiments of the present disclosure, operation 250 comprising calculating an average of the stored score-results to yield a performance-score of the classification ML model, when the performance-score is above a predefined performance-score deploying the classification ML model in a system of the tenant of the service provider.

FIGS. 3A-3B is a schematic flowchart a computerized-method for training and testing a classification Machine Learning (ML) model of a client, in a cloud-based environment, in accordance with some embodiments of the present invention.

According to some embodiments of the present disclosure, operation 310 comprising performing Hyper Parameter Optimization (HPO) on a financial crime and compliance ecosystem platform to yield performance-results. The financial crime and compliance ecosystem platform communicates with an HPO Application Programming Interface (API).

According to some embodiments of the present disclosure, operation 320 comprising evaluating the yielded performance-results to return a preconfigured number of parameters having top performance-results.

According to some embodiments of the present disclosure, operation 330 comprising using the preconfigured number of top performing hyper parameters to create a classification ML model of each parameter of the preconfigured number of parameters having top performance-results.

According to some embodiments of the present disclosure, operation 340 comprising testing each created classification ML model by: operation 350*a* comprising executing an API with the received object of the classification ML model; operation 350*b* comprising identifying one or more tenants of the service provider based on an activity type and preconfigured characteristics by the executed API; operation 350*c* comprising performing an evaluation of the object of the classification ML model by operating the API on each retrieved dataset of the one or more tenants of the service provider to evaluate the object of the classification ML model and store score-results, each dataset is having similar attributes as the received object of classification ML model; and operation 350*d* comprising calculating an average of the stored score-results to yield a performance-score of the classification ML model, when the performance-score is above a predefined performance-score deploying the classification ML model in a system of the tenant of the service provider.

Figure 4:
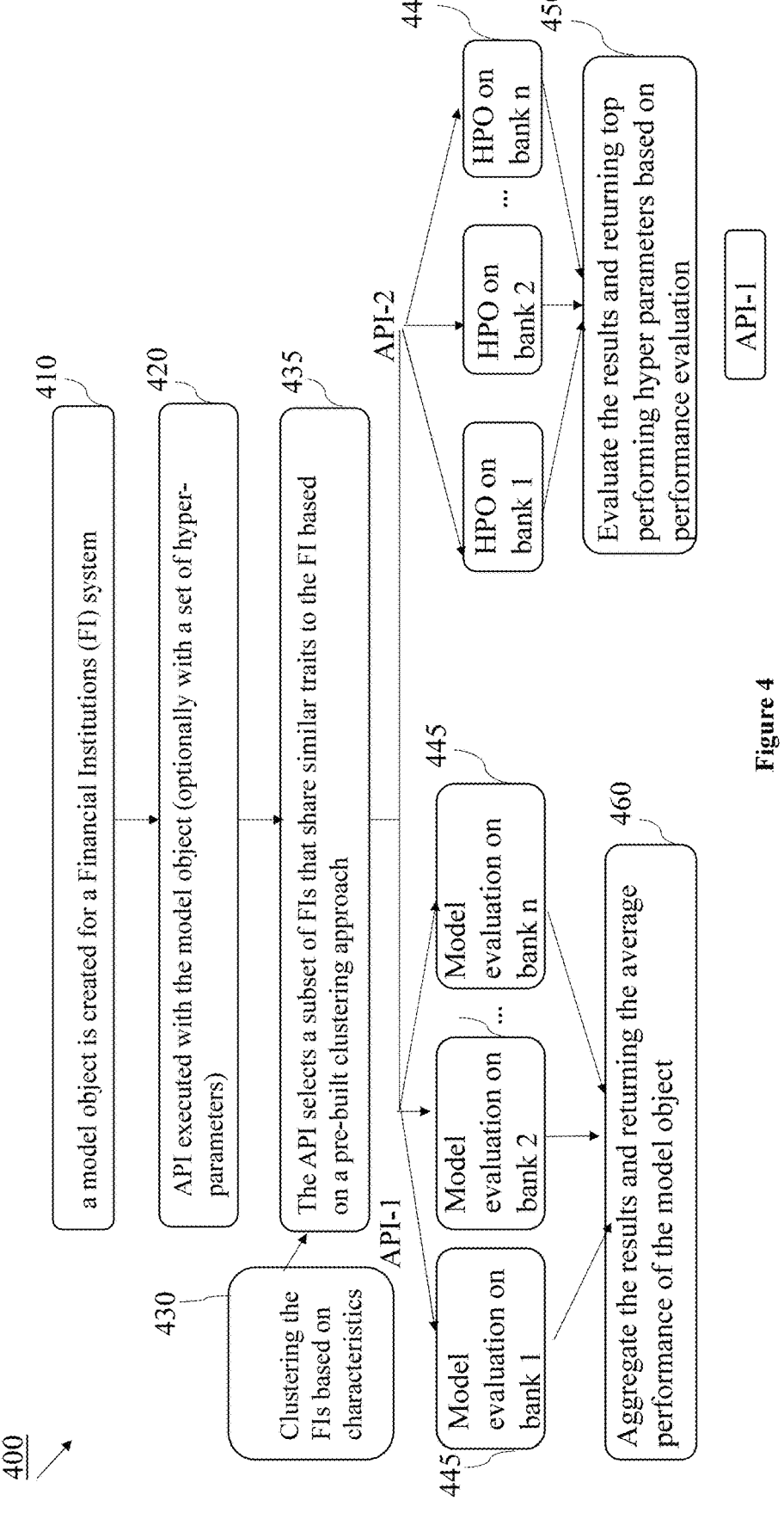
FIG. 4 is a schematic flowchart of a computerized-method for training and evaluating a classification ML model, in accordance with some embodiments of the present invention.

FIG. 4 is a schematic flowchart of a computerized-method 400 for training and evaluating a classification ML model, in accordance with some embodiments of the present invention.

According to some embodiments of the present disclosure, a model object is created for a Financial Institution system 410. An API executed with the model object, optionally with a set of hyper-parameters 420.

According to some embodiments of the present disclosure, the API may select a subset of FIs that share similar traits to the FI based on a pre-built clustering approach 435. The selection may be performed by clustering the FIs based on characteristics 430, such as fraud rate, number of transactions, unique payers, etc. The API may be an API, such as API 150*a* in FIG. 1A or such as API 150*b* in FIG. 1B.

According to some embodiments of the present disclosure, optionally, when the tenant has limited data even to perform HPO for training the classification ML model, API-2, such as HPO API 125 in FIG. 1B may be operated on datasets of identified one or more tenants, such as 'HPO on Bank 1' through 'HPO on Bank n' 440 and then the results may be evaluated to return top performing hyper parameters based on performance evaluation 450.

According to some embodiments of the present disclosure, then, operating an API-1, such as API 150*a* in FIG. 1A and such as API 150*b* in FIG. 1B for model evaluation on a dataset of the identified one or more tenants, such as 'model evaluation bank 1' through 'model evaluation bank n' 445 to aggregate the results and returning the average performance of the model object, e.g., performance-score 160*a* in FIG. 1A and such as performance-score 160*b* in FIG. 1B.

According to some embodiments of the present disclosure, when a tenant, such a financial institution, lacks a high-quality fraud data to test a classification ML model, then only API-1 such as API 150*a* in FIG. 1A and such as API 150*b* in FIG. 1B may be operated for the model evaluation.

Figure 5:
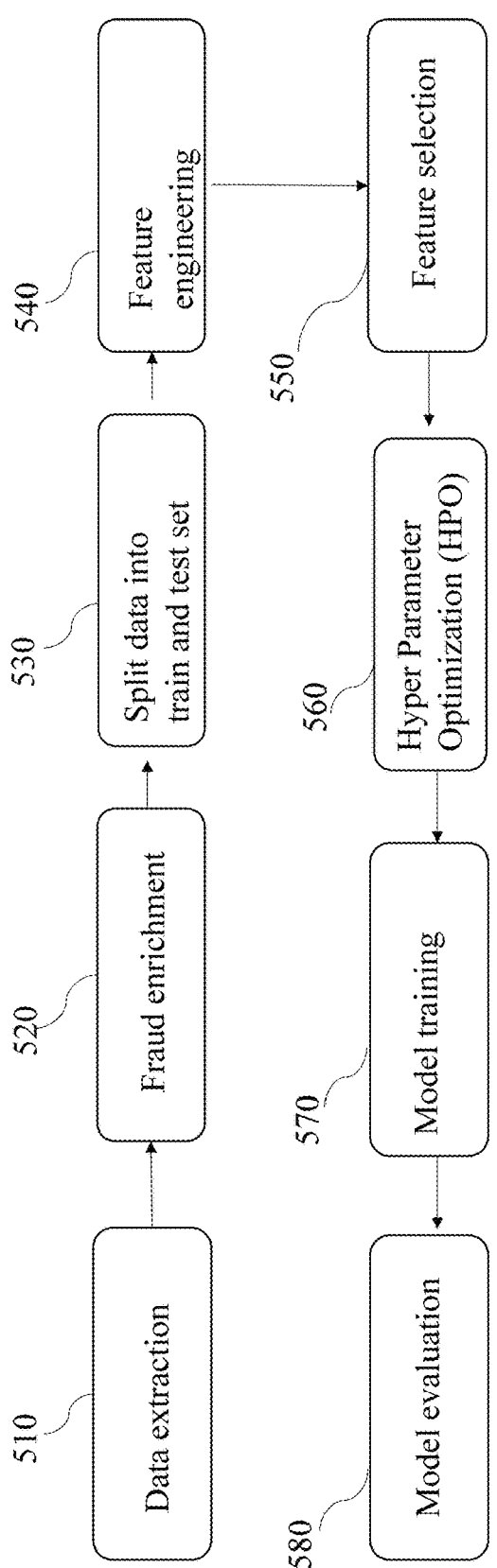
FIG. 5 is a diagram which illustrates stages of ML model creation, in accordance with some embodiments of the present invention.

FIG. 5 is a diagram which illustrates stages of ML model creation 500, in accordance with some embodiments of the present invention.

According to some embodiments of the present disclosure, ML model creation starts in data extraction 510. In data extraction 510 stage, data may be extracted for 3-6 months from database for a specific base activity. Base activities are a way to logically group together events that occur in the client's systems for profiling and detection purposes. For example, Commercial International Wire Transfer via Offline channel.

According to some embodiments of the present disclosure, the features that were considered for the ML model inclusion consisted of all features available to the decision process in the system where the classification ML model is deployed, e.g., Integrated Fraud Management (IFM), such as IFM system 155*c* in FIG. 1C, at the time of execution. This includes a variety of features describing the transaction and the party initiating the transaction. It also includes session information describing the connecting device and connection pathway, as well as the sequencing of the transaction in the current session.

According to some embodiments of the present disclosure, fraud enrichment 520 is similar to data enrichment where extra information based on a few data points is gathered. In fraud enrichment, extra fraud labels from information present for other fraud transactions are gathered. This is done by correcting some labels that we have a reason to believe the bank's analysts mistakenly tagged as legit instead of fraud. In fraud detection, the more fraud data exists about users, the more informed the decisions can be when calculating risk. This is done based on an analysis of transactions that are in proximity to fraudulent ones, in terms of some business logic-based metric, for example—same payee entity.

According to some embodiments of the present disclosure, fraud enrichment 520 may consider the following assumptions. 1. All the legit transactions were marked as enriched fraud which was initiated +/−1 day from same device key. 2. All the legit transactions for a payee entity was marked as enriched fraud if there was any fraud transaction corresponding to same payee entity. 3. All the legit transactions for a party was marked as fraud if there were any fraud transactions initiated from same device key for the same party key.

According to some embodiments of the present disclosure, data cleaning (not shown) is a critically step in any ML model creation. Data cleaning refers to identifying and correcting errors in the dataset that may negatively impact a predictive model. These includes removing features that will not add any value to the ML model. Cleaning the data includes removing null columns, correlated columns, duplicate rows and filling missing values. Features that are uniformly missing, and zero-variance features, i.e., features that are uniformly stuck at a single value, do not add any value and are removed. Highly correlated features are removed by calculating Pearson correlation coefficients between the pairs of transformed features and determining which features to eliminate.

According to some embodiments of the present disclosure, a dataset is a sub setting part of the population that represents the different entities. In split data into train and test set 530 stage, due to the sparsity of the fraud transactions, all the fraudulent observations are kept while sampling only from legit transactions. In a dataset, training set is used to build up the ML model, while a test set is to evaluate the ML model that has already been built. Data points, e.g., transactions, in the training set are excluded from test set. Commonly, a sampled dataset is divided into a training set and test set.

According to some embodiments of the present disclosure, the created ML model should predict the test data. Therefore, the training data may be used to fit the ML model and testing data may be used to test it. The generated ML models are to predict results unknown which is named as the test set. The dataset is divided into train and test set in order to check accuracies, precisions by training and testing it on it.

According to some embodiments of the present disclosure, the data is split into 80% as train set and 20% as test set, where the training stage has to be chronologically before the testing stage to avoid data leakage.

According to some embodiments of the present disclosure, feature engineering 540 stage is the process of using domain knowledge to extract features from raw data. New features may be created from the flat data, for example, date features are transformed into month, day and hour features and features based on business logic may be added, such as the first and last digits of each transaction amount. Categorical features may be encoded into frequency-based features based on below types of encoding, (a) one-hot encoding, which reduces each categorical value to a separate Boolean variable, based on whether the variable contains that value or not, (b) lift-based encoding, where each category is assigned, a numeric value based on its relative propensity to identify fraud (c) population-based encoding, where each category is assigned, a numeric value based on its relative frequency in the underlying population. The number of engineered features should remain low to avoid the complexity of dimensionality.

According to some embodiments of the present disclosure, feature selection 550 improves the ML process and increases the predictive power of ML algorithms by selecting the most important variables and eliminating redundant and irrelevant features. After feature engineering is performed, feature score may be generated by using an ML technique to identify relevant features to be used in the ML model training.

According to some embodiments of the present disclosure, Hyper Parameter Optimization (HPO) 560 stage is for the optimization of the ML model. It intends to find the hyperparameters of a given ML algorithm that deliver the best performance as measured on a validation set. Hyperparameters, in contrast to model parameters, are set by a machine learning engineer before training. The number of trees in a random forest is a hyperparameter while the weights in a neural network are model parameters learned during training. Hyperparameters may be considered as the model settings to be tuned so that the ML model can optimally solve the machine learning problem. Hyperparameter optimization finds a combination of hyperparameters that returns an optimal model which reduces a predefined loss function and in turn increases the accuracy on given input data.

According to some embodiments of the present disclosure, model training 570 is commonly operated after hyper parameter optimization 560. Model training 570 is a process in which an ML algorithm is fed with sufficient training data to learn from. It consists of the sample output data and the corresponding sets of input data that have an influence on the output. A supervised learning is a machine learning approach that's defined by its use of labeled datasets. These datasets are designed to train algorithms into classifying data or predicting outcomes accurately. Using labeled inputs and outputs, the ML model can measure its accuracy and learn over time.

According to some embodiments of the present disclosure, model evaluation 580 is a process of using different evaluation metrics to understand a ML model's performance, as well as its strengths and weaknesses. Model evaluation 580 is necessary to assess the efficacy of the ML model during initial research phases, and it also plays a role in model monitoring.

According to some embodiments of the present disclosure, An API is an application programming interface which provides a way for two or more computer programs to communicate with each other. HPO 560 and model evaluation 580 are necessary steps for tuning and evaluating the ML model. In a system, such as computerized-system 100B in FIG. 1B a tenant of a service provider may execute initially HPO API, such as HPO API 125b in FIG. 1B when the tenant doesn't have sufficient data for parameter optimization to and then an API, such as API 150a in FIG. 1A and such as API 150b in FIG. 1B for evaluation of an ML model based on the requirements.

According to some embodiments of the present disclosure, the API for the ML model evaluation, such as API 150a in FIG. 1A and such as API 150b in FIG. 1B, may select a subset of tenants, such as Financial Institutions (FI)s that share similar traits to the given FI based on a pre-built clustering approach, such as clustering the FIs based on characteristics 430 in FIG. 4, such as fraud rate, number of transactions, unique payers, etc.

According to some embodiments of the present disclosure, the API for evaluation of the ML model, such as, API 150a in FIG. 1A and such as API 150b in FIG. 1B, may be operated when the FI has sufficient data to tune e.g., HPO 560 and train a machine learning model but don't have enough frauds data to test the ML model. In this API, the ML model may be evaluated on all the similar FIs.

Figure 6:
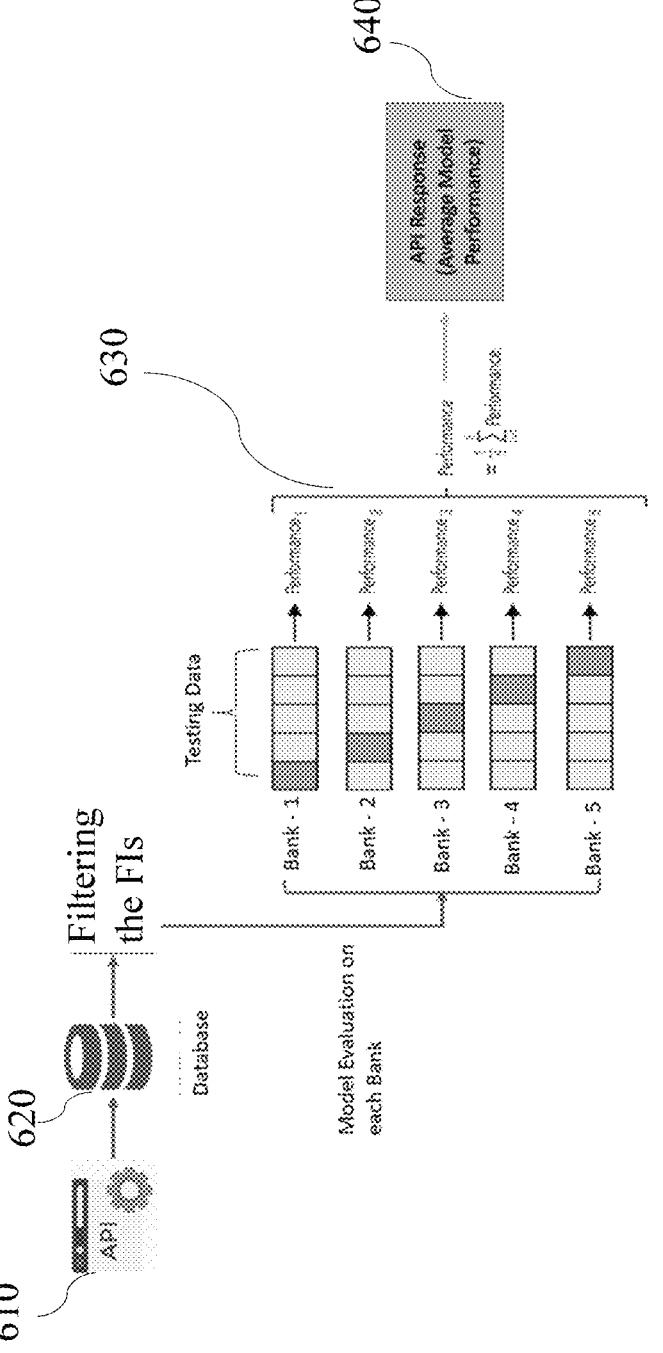
FIG. 6 is a diagram which illustrates ML model evaluation process, in accordance with some embodiments of the present invention.

FIG. 6 is a diagram which illustrates ML model evaluation process 600, in accordance with some embodiments of the present invention.

According to some embodiments of the present disclosure, in a scenario where FIs have sufficient data to tune (HPO) and train a machine learning model but don't have enough frauds to test the model they can execute model evaluation API 610, such as API 150a in FIG. 1A and such as API 150b in FIG. 1B. In this API, the model may be evaluated on datasets which are retrieved from other tenants databases, such as tenant data 110c in FIG. 1C of identified similar FIs.

According to some embodiments of the present disclosure, a client, i.e., a tenant of a service provider in a cloud computing environment may operate model evaluation API 610, such as API 150a in FIG. 1A and such as API 150b in FIG. 1B from a financial crime and compliance ecosystem platform, such as financial crime and compliance ecosystem platform 130c. The API 610 may have four parameters, the model object, feature list, list of alert rate and month for which the model has to be evaluated.

According to some embodiments of the present disclosure, next call may be given to a database 620 from where FIs will be filtered depending on their attributes or behavior, such as number of transactions in past 6 months e.g., less than 500 or greater than 500, number of general new payees in the past e.g., 3 months or e.g., 0, 1-2, 3-10, 10≤, etc.

According to some embodiments of the present disclosure, in next step, the model may be evaluated on each dataset of FI in the identified FIs and a performance report may be generated. Metrics used may be detection and value detection rate for list of alert rates suggested by client. Model evaluation output will be aggregated, and average performance of the given model may be returned as a response to API 640, e.g., performance-score 160a in FIG. 1A.

Figure 7:
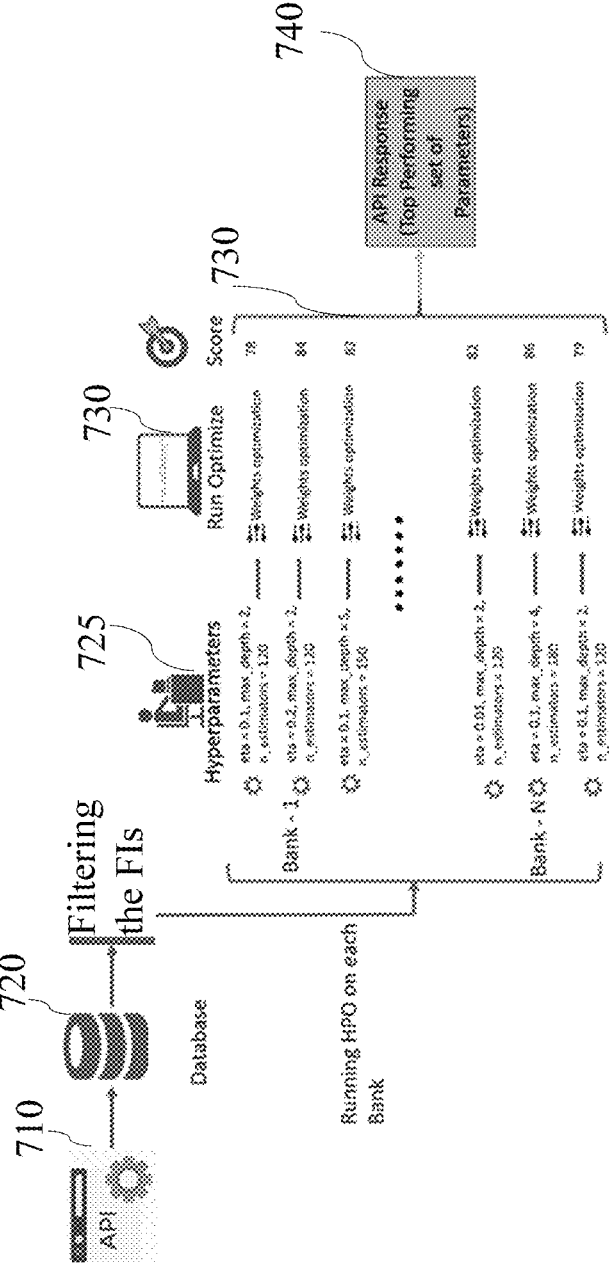
FIG. 7 is a diagram which illustrates Hyper Parameter Optimization (HPO) API process, in accordance with some embodiments of the present invention.

FIG. 7 is a diagram which illustrates Hyper Parameter Optimization (HPO) API process 700, in accordance with some embodiments of the present invention.

According to some embodiments of the present disclosure, in a scenario where a tenant such as an FI has limited data to train a classification ML model e.g., tuning (HPO) during training stage of the model and not enough data to validate the classification ML model the tenant may initially run optimization 730 by executing a Hyper Parameter Optimization (HPO) API, such as HPO API 125b in FIG. 1B to get the best combination of parameters e.g., hyperparameters 725 to tune the model and then operate a model evaluation API 710, such as API 150a in FIG. 1A and API 150b in FIG. 1B to validate the final model. The HPO API may be created on a financial crime and compliance ecosystem platform, such as financial crime and compliance ecosystem platform 130c in FIG. 1C which may be implemented as a wrapper script on machine learning package e.g., Sklearn hyper parameter optimization API.

According to some embodiments of the present disclosure, a tenant may operate via a financial crime and compliance ecosystem platform, such as financial crime and compliance ecosystem platform 130c a HPO API 730 with a set of parameters combination they want to try. The HPO API may identify similar FIs by filtering based on their attributes or behavior, such as number of transactions in past 6 months (less than 500 or greater than 500), number of general new payees in the past e.g., 3 months, e.g., 0, 1-2, 3-10, 10≤ etc.

According to some embodiments of the present disclosure, performing an HPO on a financial crime and compliance ecosystem platform to yield performance-results. The financial crime and compliance ecosystem platform communicates with an HPO API. Then, evaluating the yielded performance-results to return a preconfigured number of parameters having top performance-results.

According to some embodiments of the present disclosure, the HPO API, such as HPO API 125c in FIG. 1C may run on datasets from the similar FIs and results may be evaluated to return the top performing hyper parameters based on performance evaluation as a response to the HPO API 740.

According to some embodiments of the present disclosure, the top performing hyper parameters may be used to create a classification ML model of each parameter of the preconfigured number of parameters having top performance-results.

According to some embodiments of the present disclosure, each created classification ML model may be tested by an API such as API 150a in FIG. 1A and API 15b in FIG. 1B.

Figure 8B:
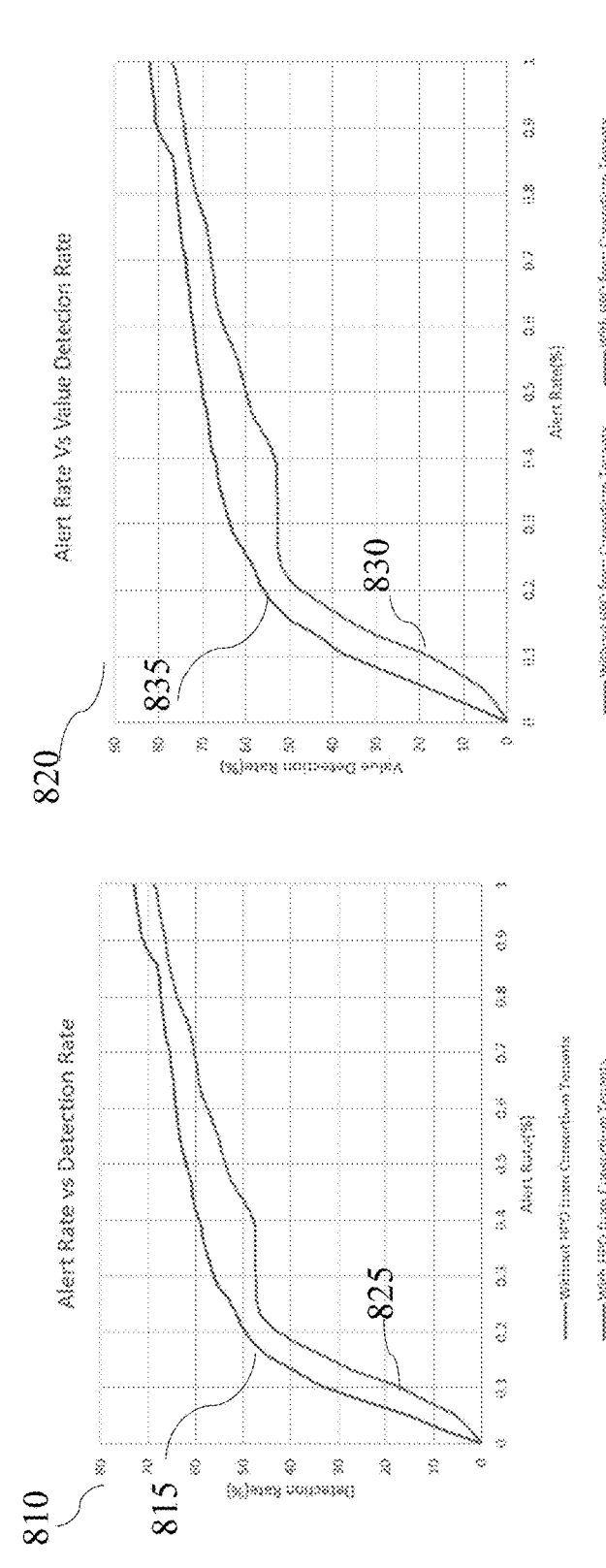

FIGS. 8A-8B are examples of performance results 800, in accordance with some embodiments of the present invention.

According to some embodiments of the present disclosure, API-1 table in 800A shows an output from an API, such as API 150a in FIG. 1. Where Detection Rate (DR) of Alert Rate (AR), DR-AR1% is an average performance in terms of detection rate for alert rate of 1%. DR-AR2% is an average performance in terms of detection rate for alert rate of 2%. Value Detection Rate (VDR) of Alert Rate (AR) VDR-AR1% is an average performance in terms of value detection rate for alert rate of 1%. VDR-AR2% is an average performance in terms of value detection rate for alert rate of 2%. API-2 table in 800A shows the output from API-2 where different column represents set of HPO parameters, such as eta i.e., step size shrinkage used in update to prevents overfitting, max_depth i.e., maximum depth of a tree, nrounds i.e., number of trees used, subsample i.e., subsample ratio of the training instances, colsample_bytree i.e., the subsample ratio of columns when constructing each tree, etc., such as when HPO API 125b in FIG. 1B is operated.

According to some embodiments of the present disclosure, diagram 810 shows the performance of a model, in terms of detection rate when an HPO API, such as HPO API 125b in FIG. 1B is used 815 for example, a model that have been trained and evaluated in a system such as computerized-system 100B in FIG. 1B, versus when the HPO API is not used 825, for example a model that has been evaluated in a system such as computerized-system 100A in FIG. 1A. Diagram 820 shows the performance of a model in terms of value detection rate when an HPO API is used 835 for example, a model that have been trained and evaluated in a system such as computerized-system 100B in FIG. 1B versus when an HPO API is not used 830, for example a model that has been evaluated in a system such as computerized-system 100A in FIG. 1A. A lift in performance of 5-7% in both DR and VDR is shown when an HPO API is used.

Figure 9:
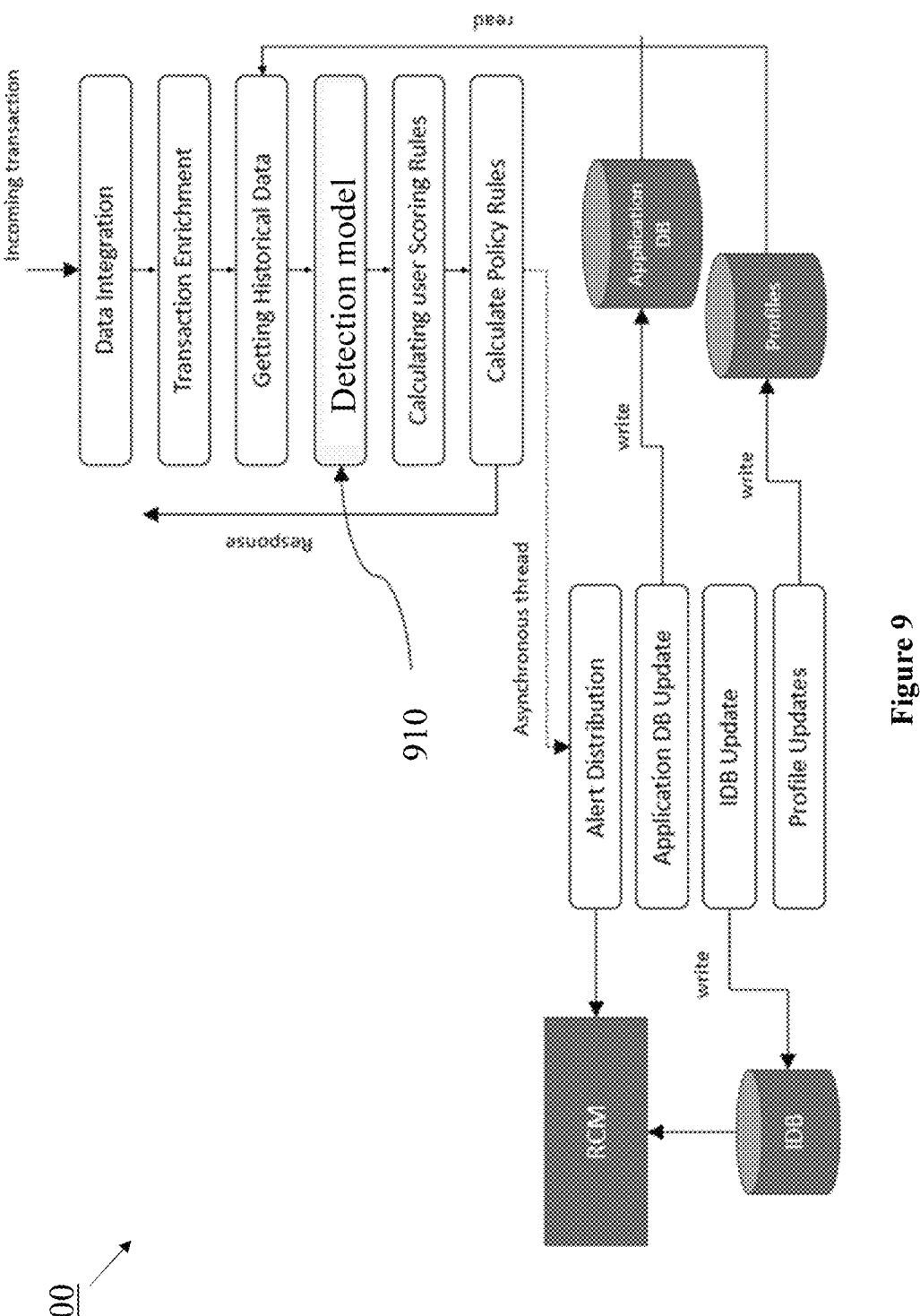
FIG. 9 is a high-level process flow diagram of a system which includes a classification ML model, in accordance with some embodiments of the present disclosure.

FIG. 9 is a high-level process flow diagram of a system 900 which includes a classification ML model, in accordance with some embodiments of the present disclosure.

According to some embodiments of the present disclosure, in a system, such as Fraud Management System 900 and such as Integrated Fraud Management (IFM) system 155c in FIG. 1C, there are incoming transactions into a data integration component which operates an initial preprocess of the data. Transaction enrichments component operates a preprocess of the transactions. The process of getting historical data synchronizes with new incoming transactions is followed by a fraud detection model 910 after which, each transaction gets its risk score. The fraud detection model may be an ML model that has been tested in a system, such as computerized-system 100A in FIG. 1 or an ML model that has been trained and tested in a system, such as computerized-system 100B in FIG. 1B.

According to some embodiments of the present disclosure, profiles database contains aggregated financial transactions according to a time period. Profile updates synchronize according to newly opened accounts or incoming transactions. Risk Case Management (RCM) system is a system that operates a risk score management, including investigation, monitoring, sending alerts, or marking as no risk.

According to some embodiments of the present disclosure, an Investigation DataBase (IDB) system is operating to research transactional data and policy rules resulting for investigation purposes. It analyzes historical cases and alert data. Data can be used by the solution or by external applications that can query the database, for example, to produce rule performance reports.

According to some embodiments of the present disclosure, analysts can define calculated variables using a comprehensive context, such as the current transaction, the history of the main entity associated with the transaction, the built-in models result etc. These variables can be used to create new indicative features. The variables can be exported to the detection log, stored in IDB and exposed to users in user analytics contexts.

According to some embodiments of the present disclosure, transactions that satisfy certain criteria may indicate occurrence of events that may be interesting for the analyst. The analyst can define events the system identifies and profiles when processing the transaction. This data can be used to create complementary indicative features (using the custom indicative features mechanism or Structured Model Overlay (SMO). For example, the analyst can define an event that says: amount>$100,000. The system profiles aggregations for all transactions that trigger this event e.g., first time it happened for the transaction party etc.

According to some embodiments of the present disclosure, once custom events are defined, the analyst can use predefined indicative feature templates to enrich built-in models results with new indicative features calculations. The analyst may create an indicative feature that says that if it has been more than a year since the customer performed a transaction with amount greater than $100,000 then add 10 points to the overall risk score of the model.

According to some embodiments of the present disclosure, activities are a way to logically group together events that occur in the client's systems. Each channel is an activity, for example, Web activity. Each type of service is an activity, for example, Internal Transfer activity. Each combination of an activity and a type of service is an activity, for example, Web Internal Transfer Activity. Activities can span multiple channels and services, for example, the Transfer activity, which is any activity that results in a transfer. Transactions can be associated with multiple activities.

According to some embodiments of the present disclosure, activities are divided into multiple base activities. Base activities represent the most specific activity the customer performed and determine which detection models are calculated for a transaction. Each transaction is mapped to one and only one base activity, e.g., activity type. This default base activity is usually determined according to the channel and the transaction type, as well as additional fields and calculations.

According to some embodiments of the present disclosure, the base activity of a transaction is generally set by combining the channel type and the transaction type as mapped in data integration. The definition of some base activities is also based on the value of an additional field or a calculated indicator, as detailed in the tables in this section. Descriptions of additional client and implementation fields can be found in the IFM Internal Master Feed Excel file provided with the related documentation.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for testing a classification Machine Learning (ML) model of a tenant of a service provider, in a cloud-based environment, said computerized-method comprising:
   (i) receiving an object of a classification ML model for testing, from the tenant;
   (ii) executing an Application Programming Interface (API) with the received object of the classification ML model;
   (iii) identifying one or more tenants of the service provider based on an activity type and preconfigured characteristics by the executed API,
      wherein the tenants are financial Institutions (FI)s, and
      wherein the preconfigured characteristics are selected from at least one of: (i) fraud rate; (iii) number of transactions in a preconfigured period; (iii) unique payee; (iv) average daily transaction; (v) average weekly transaction; and (vi) number of clean transaction divided by number of fraud transaction,
   (iv) performing an evaluation of the object of the classification ML model by operating the API on each retrieved dataset of the one or more tenants of the service provider to evaluate the object of the classification ML model and store score-results,
      wherein each dataset is having similar attributes as the received object of classification ML model; and
   (v) calculating an average of the stored score-results to yield a performance-score of the classification ML model, wherein, when the performance-score is above a predefined performance-score deploying the classification ML model in a system of the tenant of the service provider.

2. The computerized-method of claim 1, wherein the identified one or more tenants share similar traits to the tenant that is having the classification ML model tested.

3. The computerized-method of claim 1, wherein the evaluation of the object of the classification ML model is operated on one or more datasets of tenants of the service provider.

4. The computerized-method of claim 1, wherein the evaluation of the object of the classification ML model is by at least one parameters of: (i) feature list; (ii) list of alert rate; and (iii) month.

5. The computerized-method of claim 1, wherein the evaluation is performed according to detection rate and value detection rate for a list of alert rates provided by the tenant.

6. The computerized-method of claim 1, wherein data of each retrieved dataset of the one or more tenants of the service provider is uploaded to a cloud object storage from one or more databases in each identified tenant system.

7. The computerized-method of claim 1, wherein the one or more databases are selected from at least one of: (i) customer database; (ii) recent data database; and (iii) behavioral profiles database.

8. The computerized-method of claim 1, wherein the system of the tenant of the service provider that the classification ML model is deployed in is an Integrated Fraud Management (IFM) system for automatically scoring financial transactions by the operation of the deployed classification ML model.

9. The computerized-method of claim 8, wherein based on a score of a financial transaction the financial transaction is allowed or declined or delayed until an operator action is taken regarding the transaction.

10. The computerized-method of claim 1, wherein the activity is selected from at least one of: (i) Person to Person (P2P) transfer; and (ii) Automated Clearing House (ACH) transfer; (iii) checks deposit; (iv) non wire transfer; and (v) wire transfer.

11. A computerized-system for testing a classification Machine Learning (ML) model of a tenant of a service provider, in a cloud-based environment, said computerized-system comprising:
   one or more processors, said one or more processors are configured to:
      (i) receive an object of a classification ML model for testing, from the tenant;
      (ii) execute an Application Programming Interface (API) with the received object of the classification ML model;
      (iii) identify one or more tenants of the service provider based on an activity type and preconfigured characteristics by the executed API,
         wherein the tenants are financial Institutions (FI)s, and
         wherein the preconfigured characteristics are selected from at least one of: (i) fraud rate; (iii) number of transactions in a preconfigured period; (iii) unique payee; (iv) average daily transaction; (v) average weekly transaction; and (vi) number of clean transaction divided by number of fraud transaction,
      (iv) perform an evaluation of the object of the classification ML model by operating the API on each retrieved dataset of the one or more tenants of the service provider to evaluate the object of the classification ML model and store score-results, wherein each dataset is having similar attributes as the received object of classification ML model; and (v) calculate an average of the stored score-results to yield a performance-score of the classification ML model, wherein, when the performance-score is above a predefined performance-score deploying the classification ML model in a system of the tenant of the service provider.

12. A computerized-method for training and testing a classification Machine Learning (ML) model of a tenant of a service provider, in a cloud-based environment, said computerized-method comprising:

(i) performing Hyper Parameter Optimization (HPO) on a financial crime and compliance ecosystem platform to yield performance-results, wherein the financial crime and compliance ecosystem platform communicates with an HPO Application Programming Interface (API);

(ii) evaluating the yielded performance-results to return a preconfigured number of parameters having top performance-results;

(iii) using the preconfigured number of top performing hyper parameters to create a classification ML model of each parameter of the preconfigured number of parameters having top performance-results; and (iv) testing each created classification ML model by:
a. executing an API with the received object of the classification ML model;
b. identifying one or more tenants of the service provider based on an activity type and preconfigured characteristics by the executed API, wherein the tenants are financial Institutions (FI)s, and wherein the preconfigured characteristics are selected from at least one of: (i) fraud rate; (iii) number of transactions in a preconfigured period; (iii) unique payee; (iv) average daily transaction; (v) average weekly transaction; and (vi) number of clean transaction divided by number of fraud transaction, c. performing an evaluation of the object of the classification ML model by operating the API on each retrieved dataset of the one or more tenants of the service provider to evaluate the object of the classification ML model and store score-results, wherein each dataset is having similar attributes as the received object of classification ML model; and d. calculating an average of the stored score-results to yield a performance-score of the classification ML model, wherein, when the performance-score is above a predefined performance-score deploying the classification ML model in a system of the tenant of the service provider.

* * * * *